US012602837B2

(12) United States Patent
Gao et al.

(10) Patent No.: US 12,602,837 B2
(45) Date of Patent: Apr. 14, 2026

(54) ON SUB-DIVISION OF MESH SEQUENCES

(71) Applicant: TENCENT AMERICA LLC, Palo Alto, CA (US)

(72) Inventors: Wen Gao, West Windsor, NJ (US); Jun Tian, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 161 days.

(21) Appl. No.: 18/672,798

(22) Filed: May 23, 2024

(65) Prior Publication Data

US 2024/0394925 A1      Nov. 28, 2024

Related U.S. Application Data

(60) Provisional application No. 63/468,756, filed on May 24, 2023.

(51) Int. Cl.
*G06T 15/40*          (2011.01)
*G06T 9/00*          (2006.01)

(52) U.S. Cl.
CPC ................................... *G06T 9/001* (2013.01)

(58) Field of Classification Search
CPC ................................ G06T 9/001; G06T 9/004
See application file for complete search history.

(56) References Cited

U.S. PATENT DOCUMENTS

| | | | | |
|---|---|---|---|---|
| 5,889,524 A * | 3/1999 | Sheehan | ................. | G06T 17/20 |
| | | | | 345/419 |
| 6,577,310 B1 * | 6/2003 | Kim | ........................ | G06T 9/001 |
| | | | | 375/E7.084 |
| 6,668,091 B1 * | 12/2003 | Kim | ........................ | G06T 9/001 |
| | | | | 382/241 |
| 7,348,976 B2 * | 3/2008 | Mori | ....................... | G06T 17/20 |
| | | | | 345/423 |
| 8,797,328 B2 * | 8/2014 | Corazza | ................. | G06T 17/20 |
| | | | | 345/473 |
| 9,171,396 B2 * | 10/2015 | Jenkins | ................... | G06T 15/40 |

(Continued)

FOREIGN PATENT DOCUMENTS

| | | | | | |
|---|---|---|---|---|---|
| EP | 0895577 B1 * | 4/2005 | ........... | G01B 11/002 |
| EP | 2833326 B1 * | 4/2016 | ........... | G06T 17/205 |

OTHER PUBLICATIONS

Leif Kobbelt, "√3-Subdivision", Max-Planck Institute for Computer Sciences, 2000 (10 pages).

(Continued)

*Primary Examiner* — Philip P. Dang
(74) *Attorney, Agent, or Firm* — Sughrue Mion, PLLC

(57)          ABSTRACT

A method and apparatus comprising computer code configured to cause a processor or processors to obtain, from a bitstream, a mesh representing an encoded volumetric data of at least one three-dimensional (3D) visual content, and decode the encoded volumetric data based on displacement vectors of vertices of the mesh, and the displacement vectors are based on a square root of three subdivision in which faces of the mesh are iteratively subdivided in a manner in which a number of subdivided faces resulting from subdividing the mesh in an iteration is less than four times a number of faces from before subdividing the mesh in the iteration.

20 Claims, 17 Drawing Sheets

<u>700</u>

(56) References Cited

U.S. PATENT DOCUMENTS

| | | | | |
|---|---|---|---|---|
| 10,109,103 | B2 * | 10/2018 | Jenkins | G06T 15/40 |
| 10,121,279 | B1 * | 11/2018 | Sundaram | G06T 15/20 |
| 11,450,077 | B2 * | 9/2022 | Munkberg | G06T 1/20 |
| 11,481,974 | B2 * | 10/2022 | Szilagyi | G06T 9/001 |
| 2002/0159518 | A1 * | 10/2002 | Bottreau | H04N 19/36 |
| | | | | 375/240.1 |
| 2005/0168460 | A1 * | 8/2005 | Razdan | G06F 16/2428 |
| | | | | 345/419 |
| 2007/0035541 | A1 * | 2/2007 | Isner | G06T 17/20 |
| | | | | 345/420 |
| 2008/0024487 | A1 * | 1/2008 | Isner | G06T 13/40 |
| | | | | 345/473 |
| 2015/0145859 | A1 * | 5/2015 | Corazza | G06T 13/40 |
| | | | | 345/419 |
| 2020/0294271 | A1 * | 9/2020 | Ilola | G06T 17/20 |
| 2020/0410752 | A1 * | 12/2020 | Jiang | G06T 15/20 |
| 2021/0082184 | A1 * | 3/2021 | Claessen | G06N 3/08 |
| 2021/0090301 | A1 * | 3/2021 | Mammou | H04N 19/20 |
| 2021/0174551 | A1 * | 6/2021 | Graziosi | G06T 17/20 |
| 2021/0225075 | A1 * | 7/2021 | Szilagyi | G06T 15/06 |
| 2022/0164994 | A1 * | 5/2022 | Joshi | G06T 9/001 |
| 2022/0410002 | A1 * | 12/2022 | Kokins | G06T 15/20 |
| 2023/0078840 | A1 * | 3/2023 | Salvi | G06T 1/60 |
| | | | | 345/423 |
| 2023/0084570 | A1 * | 3/2023 | Muthler | G06T 9/001 |
| | | | | 345/426 |
| 2023/0401755 | A1 * | 12/2023 | Mammou | G06T 9/001 |

OTHER PUBLICATIONS

"WD 2.0 of V-DMC", ISO/IEC JTC 1/SC 29/WG 07, N546, Feb. 11, 2023 (2 pages).
"CfP for Dynamic Mesh Coding", ISO/IEC JTC 1/SC 29/WG 2, MPEG Technical requirements Convenorship: SFS (Finland), N145, Oct. 29, 2021 (39 pages).
"V-Mesh Test Model v1", ISO/IEC JTC 1/SC 29/WG 7, MPEG 3D Graphics and Haptics Coding, N00404, Convenorship: AFNOR (France) Aug. 2022 (3 pages).
"Information technology—Coded representation of immersive media—Part 29: Video-based dynamic mesh coding (V-DMC)", ISO/IEC JTC 1/SC 29/WG 7, ISO 23090-29:2023(E), Feb. 10, 2023, pp. 1-68 (74 pages).

* cited by examiner

ON SUB-DIVISION OF MESH SEQUENCES

CROSS REFERENCE TO RELATED APPLICATION

This application claims priority to U.S. provisional application 63/468,756 filed on May 24, 2023, the disclosure of which is incorporated herein by reference in its entirety.

BACKGROUND

1. Field

The present disclosure is directed a set of advanced video coding technologies including mesh sequences.

2. Description of Related Art

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

In October 2011, MPEG issued a call for proposals for dynamic mesh coding and received multiple responses in April 2022. A reference software, so called, V-Mesh Test Model, was developed based on the received responses and is being used for evaluation of dynamic mesh coding tools during the standardization process.

In a mesh codec, such as MPEG V-Mesh Test model, a mid-point subdivision method is employed to refine a decimated mesh sequences due to its simplicity. However, one drawback of mid-point subdivision is that its granularity is large, i.e., every iteration of mid-point subdivision will quadruple the number of triangles. For example, three iterations of subdivisions increase the number of triangles to 64 times of that of the original one. I In addition, displacement vectors, either 3D vectors or 1D vectors along the normal direction, are often used to offset the position of the mid-point vertices and the original vertices. Since one mid-point vertex is generated for each edge of the original mesh, the number of additional displacement vectors will be number of edges in the original mesh.

And for any of those reasons there is therefore a desire for technical solutions to such problems that arose in video coding technology.

SUMMARY

There is included a method and apparatus comprising memory configured to store computer program code and a processor or processors configured to access the computer program code and operate as instructed by the computer program code. The computer program is configured to cause the processor implement obtaining code configured to cause the at least one processor to obtain, from a bitstream, a mesh representing an encoded volumetric data of at least one three-dimensional (3D) visual content; and decode the encoded volumetric data based on displacement vectors of vertices of the mesh, and the displacement vectors are based on a square root of three subdivision in which faces of the mesh are iteratively subdivided in a manner in which a number of subdivided faces resulting from subdividing the mesh in an iteration is less than four times a number of faces from before subdividing the mesh in the iteration.

According to an aspect of the disclosure, the square root of three subdivision may include, in the iteration: inserting one of a plurality of inserted vertices into ones of the faces from before subdividing the mesh in the iteration, and interconnecting the plurality of inserted vertices thereby forming the number of subdivided faces of the mesh.

According to an aspect of the disclosure, inserting one of the plurality of inserted vertices into ones of the faces from before subdividing the mesh in the iteration may include inserting only one of the plurality of inserted vertices per the faces from before subdividing the mesh in the iteration.

According to an aspect of the disclosure, at least one of the inserted vertices, inserted into one of the faces from before subdividing the mesh, may be based on a linear combination of coordinates of vertices of the one of the faces.

According to an aspect of the disclosure, the linear combination may include each of the coordinates of the vertices of the ones of the faces scaled by respective non-negative real coefficients.

According to an aspect of the disclosure, the respective non-negative real coefficients may be each set to $\frac{1}{3}$.

According to an aspect of the disclosure, the square root of three subdivision may include subdividing boundary edges of the mesh differently than interior edges of the mesh such that at least two new inserted vertices are added in the iteration to at least one of the boundary edges.

BRIEF DESCRIPTION OF THE DRAWINGS

Further features, nature, and various advantages of the disclosed subject matter will be more apparent from the following detailed description and the accompanying drawings in which:

FIG. 3 is an illustration of aspects of a decoder in accordance with one or more embodiments herein;

FIG. 4 is an illustration of aspects of an encoder in accordance with one or more embodiments herein;

FIG. 5 is an illustration of aspects of an encoder side in accordance with one or more embodiments herein;

FIG. 6 is an illustration of aspects of a decoder side in accordance with one or more embodiments herein;

FIG. 13 is an illustration of aspects of a mesh subdivision process in accordance with one or more embodiments herein;

FIG. 17 is a simplified illustration of systems involved in accordance with one or more embodiments herein.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
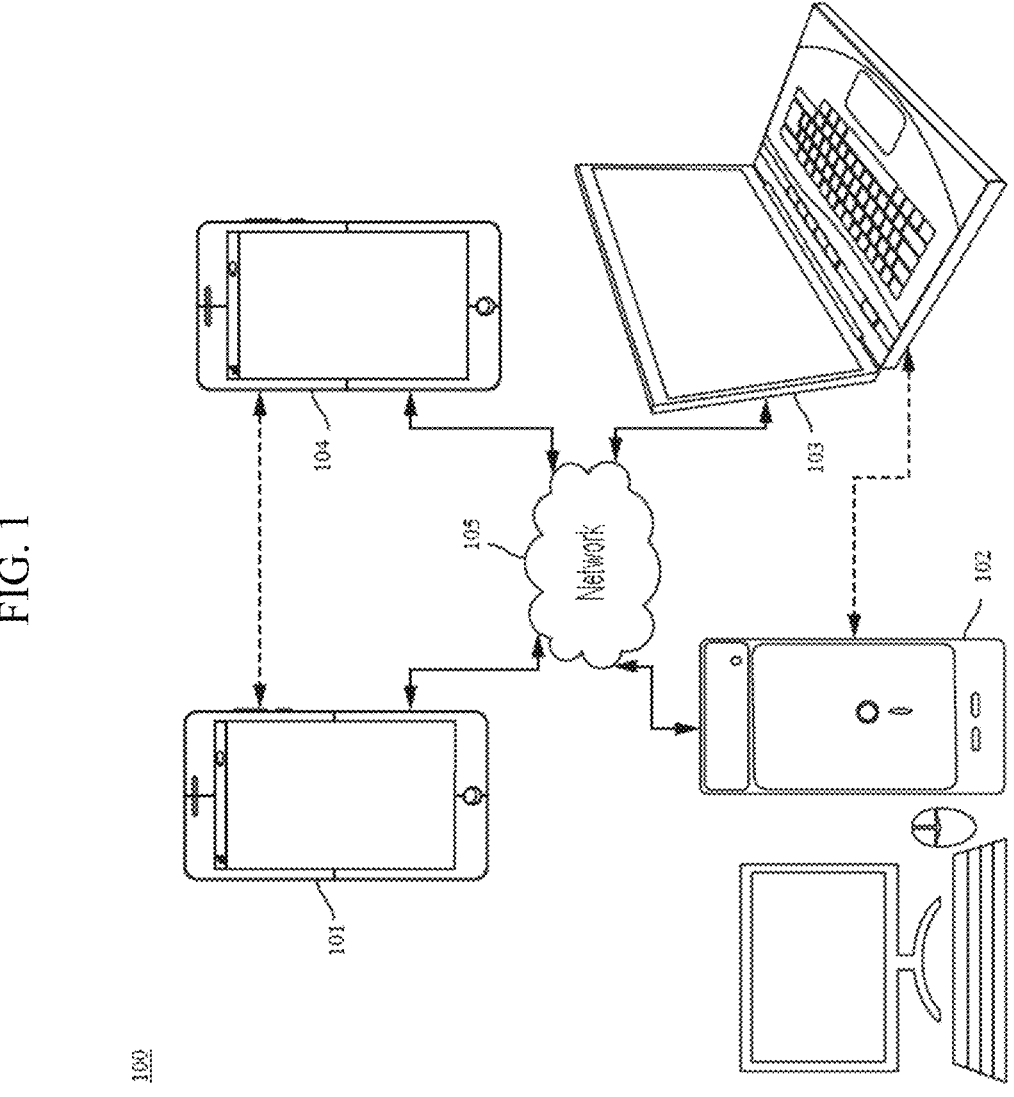
FIG. 1 is an illustration of aspects a communication system in accordance with one or more embodiments herein.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
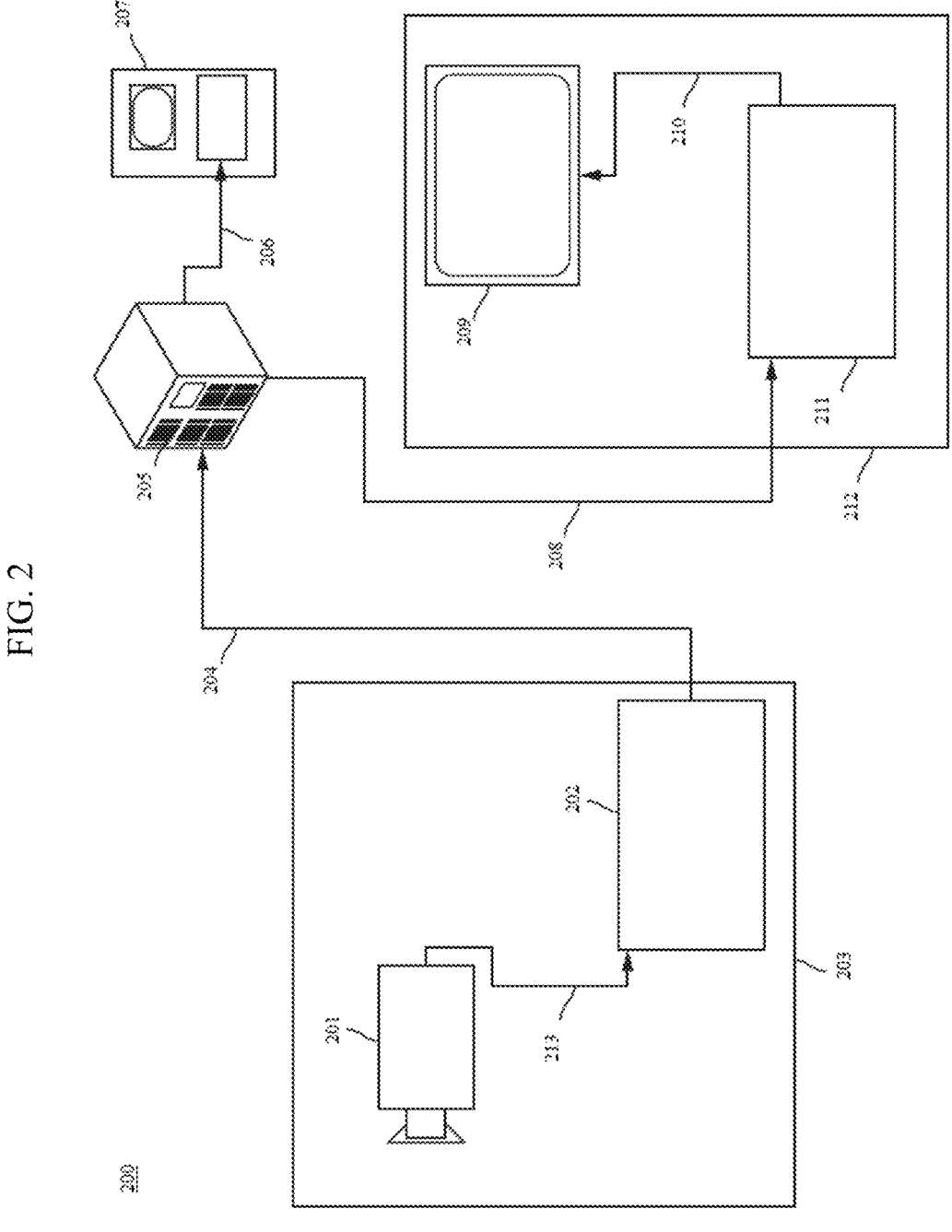
FIG. 2 is an illustration of aspects of a media processing system in accordance with one or more embodiments herein.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
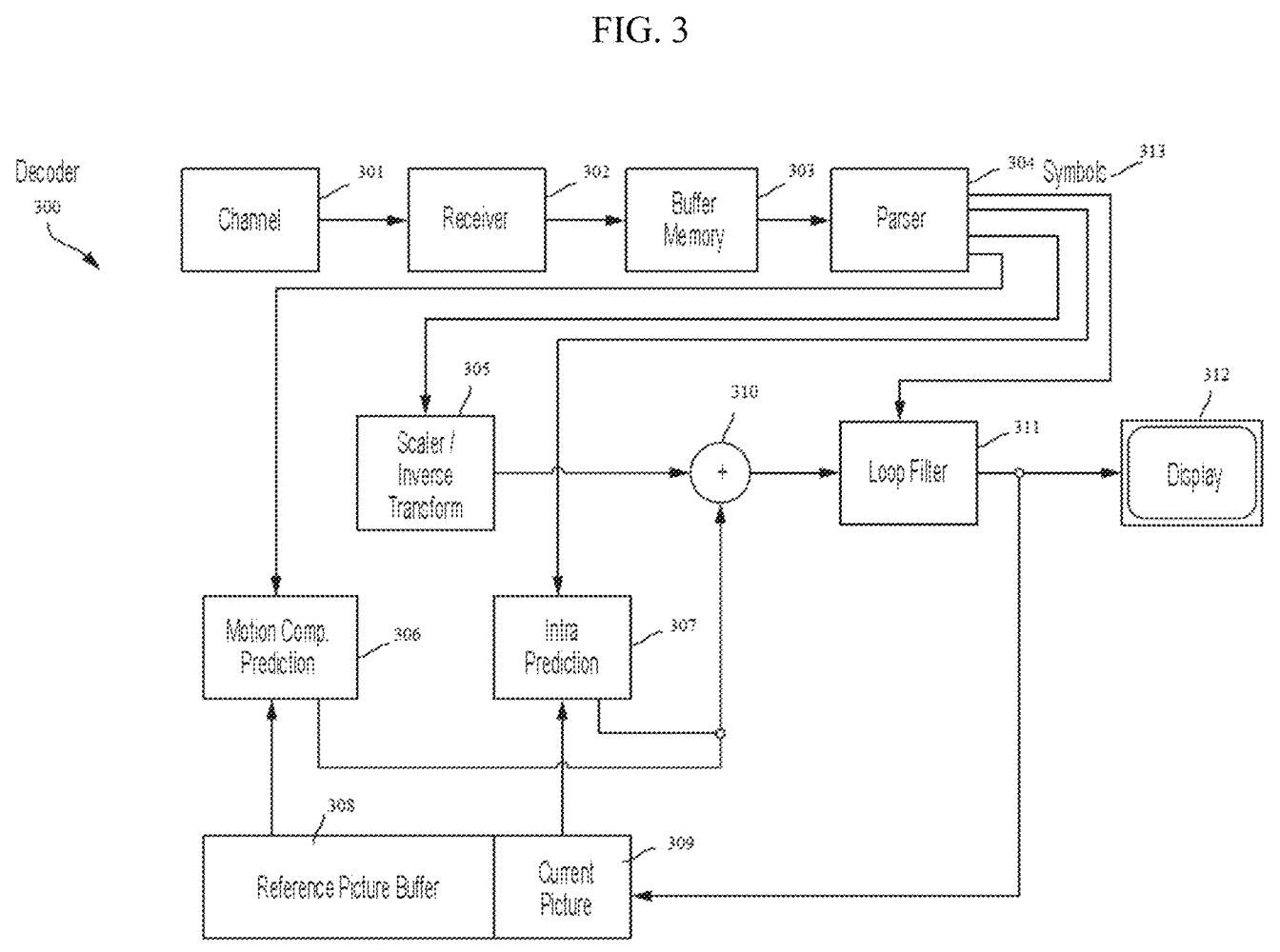

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
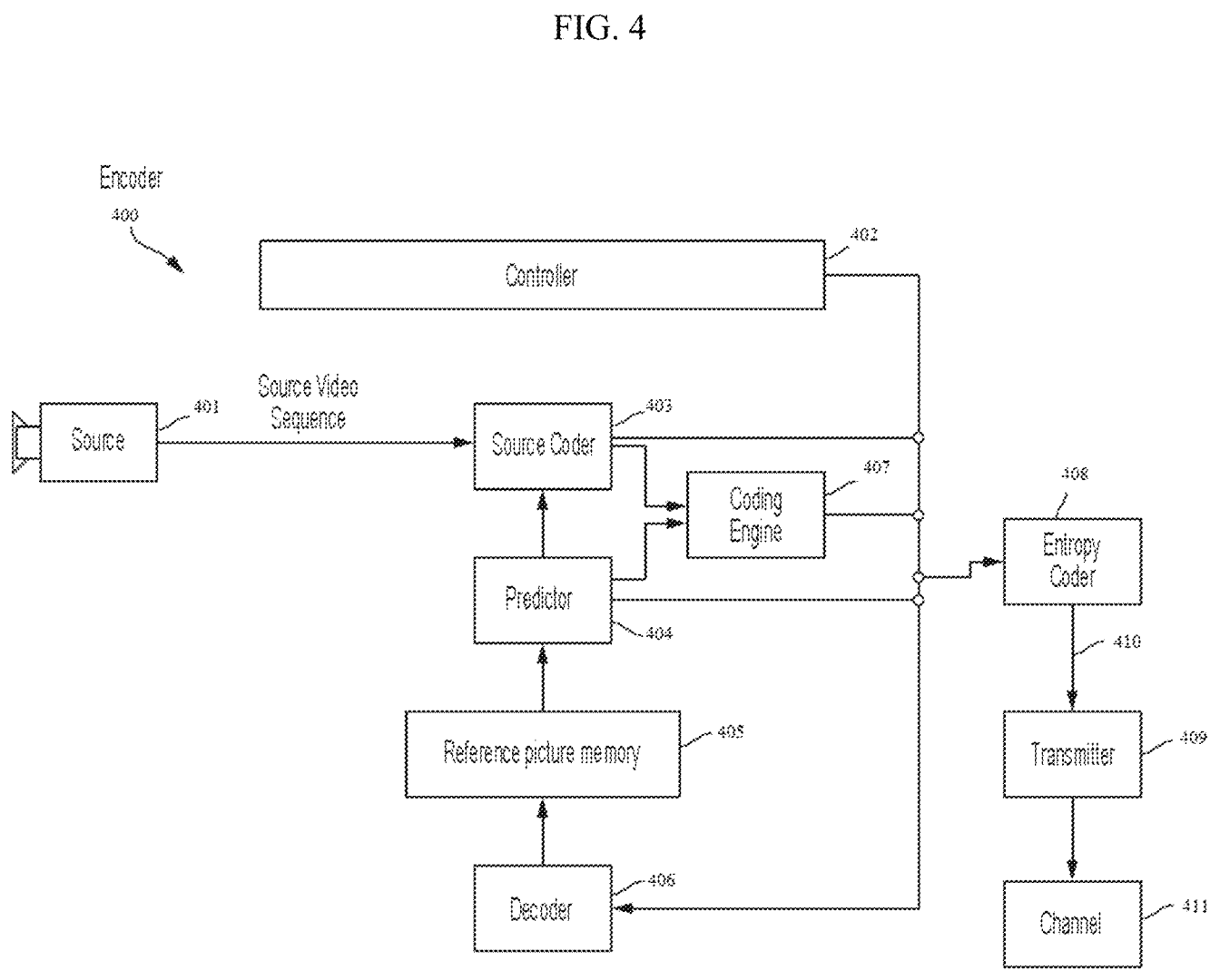

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 400 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405, which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the source coder 403, which may be for example a video coder, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the source coder 403 with other data to be transmitted, for example, coded audio data and/or ancillary data streams (sources not shown).

The controller 402 may manage operation of the encoder 400. During coding, the controller 402 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 400, which may be for example a video coder, may perform coding operations according to a predetermined video coding technology or standard, such as ITU-T Rec. H.265. In its operation, the encoder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/ SNR enhancement layers, other forms of redundant data such as redundant pictures and slices, Supplementary Enhancement Information (SEI) messages, Visual Usability Information (VUI) parameter set fragments, and so on.

Figure 5:
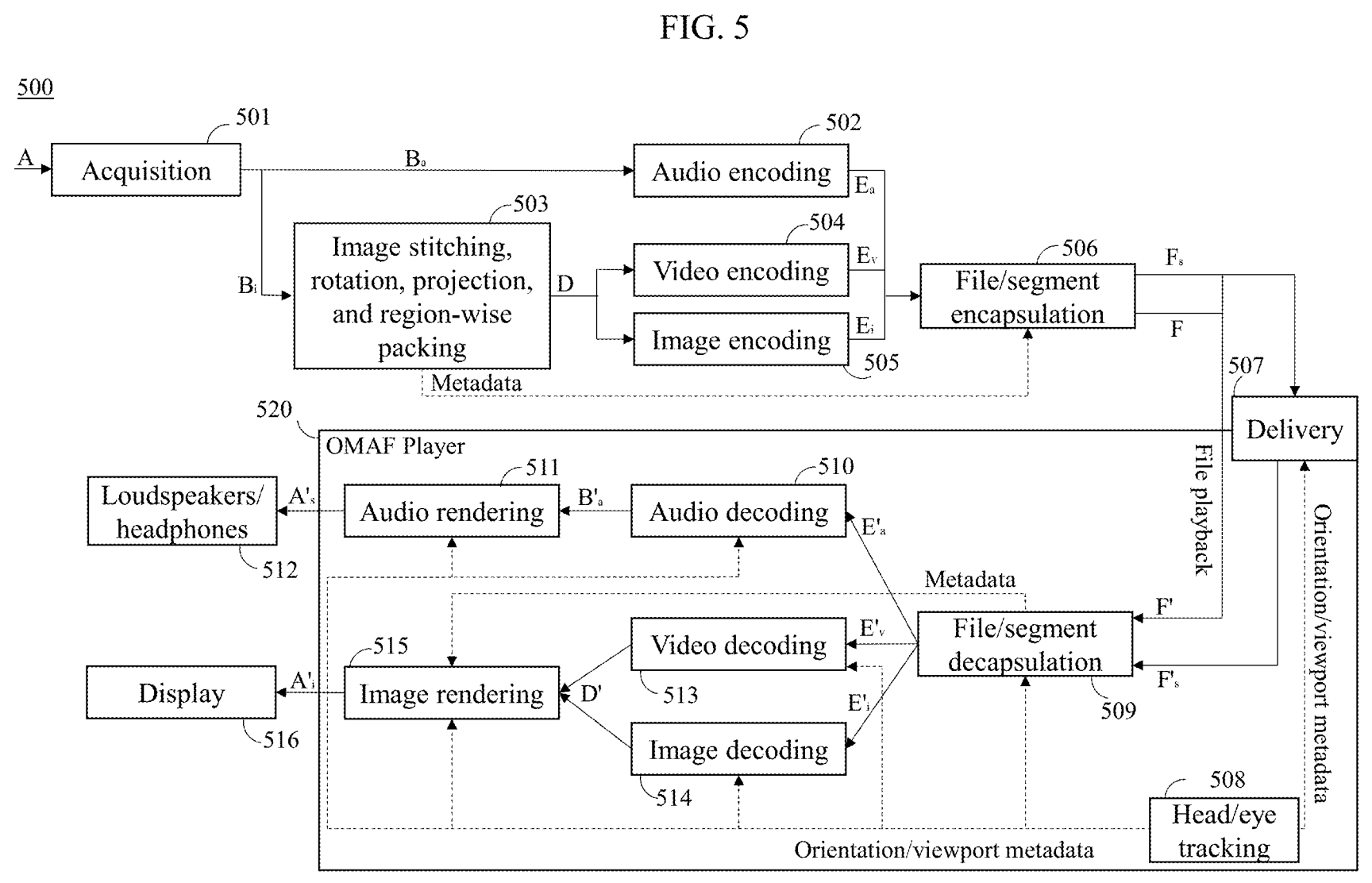

FIG. 5 illustrates a simplified block-style workflow diagram 500 of exemplary view-port dependent processing an in Omnidirectional Media Application Format (OMAF) that may allow for 360-degree virtual reality (VR360) streaming described in OMAF.

At acquisition block 501, video data A is acquired, such as data of multiple images and audio of same time instances in a case that the image data may represent scenes in VR360. At processing block 503, the images $B_i$ of the same time instance are processed by one or more of being stitched, mapped onto a projected picture with respect to one or more virtual reality (VR) angles or other angles/viewpoint(s) and region-wise packed. Additionally, metadata may be created indicating any of such processed information and other information so as to assist in delivering and rendering processes.

With respect to data D, at image encoding block 505, the projected pictures are encoded to data E; and composed into a media file, and in viewport-independent streaming, and at video encoding block 504, the video pictures are encoded as data $E_v$ as a single-layer bitstream, for example, and with respect to data Ba the audio data may also be encoded into data $E_a$ at audio encoding block 502.

The data $E_a$, $E_v$, and $E_i$, the entire coded bitstream $F_i$ and/or F may be stored at a (content delivery network (CDN)/cloud) server, and typically may be fully transmitted, such as at delivery block 507 or otherwise, to an OMAF player 520 and may be fully decoded by a decoder such that at least an area of a decoded picture corresponding to a current viewport is rendered to the user at display block 516 with respect to the various metadata, file playback, and orientation/viewport metadata, such as an angle at which a user may be looking through a VR image device with respect to viewport specifications of that device, from the head/eye tracking block 508. A distinct feature of VR360 is that only a viewport may be displayed at any particular time, and such feature may be utilized to improve the performance of omnidirectional video systems, through selective delivery depending on the user's viewport (or any other criteria, such as recommended viewport timed metadata). For example, viewport-dependent delivery may be enabled by tile-based video coding according to exemplary embodiments.

As with the encoding blocks described above, the OMAF player 520 according to exemplary embodiments may similarly reverse one or more facets of such encoding with respect to the file/segment decapsulation of one or more of the data F' and/or F'$_i$ and metadata, decode the audio data E'$_i$ at audio decoding block 510, the video data E'$_v$ at video decoding block 513, and the image data E'$_i$ at image decoding block 514 to proceed with audio rendering of the data B'$_a$ at audio rendering block 511 and image rendering of the data D' at image rendering block 515 so as to output, in a VR360 format according to various metadata such as the orientation/viewport metadata, display data A'$_i$ at display block 516 and audio data A'$_s$ at the loudspeakers/headphones block 512. The various metadata may influence ones of the data decoding and rendering processes depending on various tracks, languages, qualities, views, that may be selected by or for a user of the OMAF player 520, and it is to be understood that the order of processing described herein is presented for exemplary embodiments and may be implemented in other orders according to other exemplary embodiments.

Figure 6:
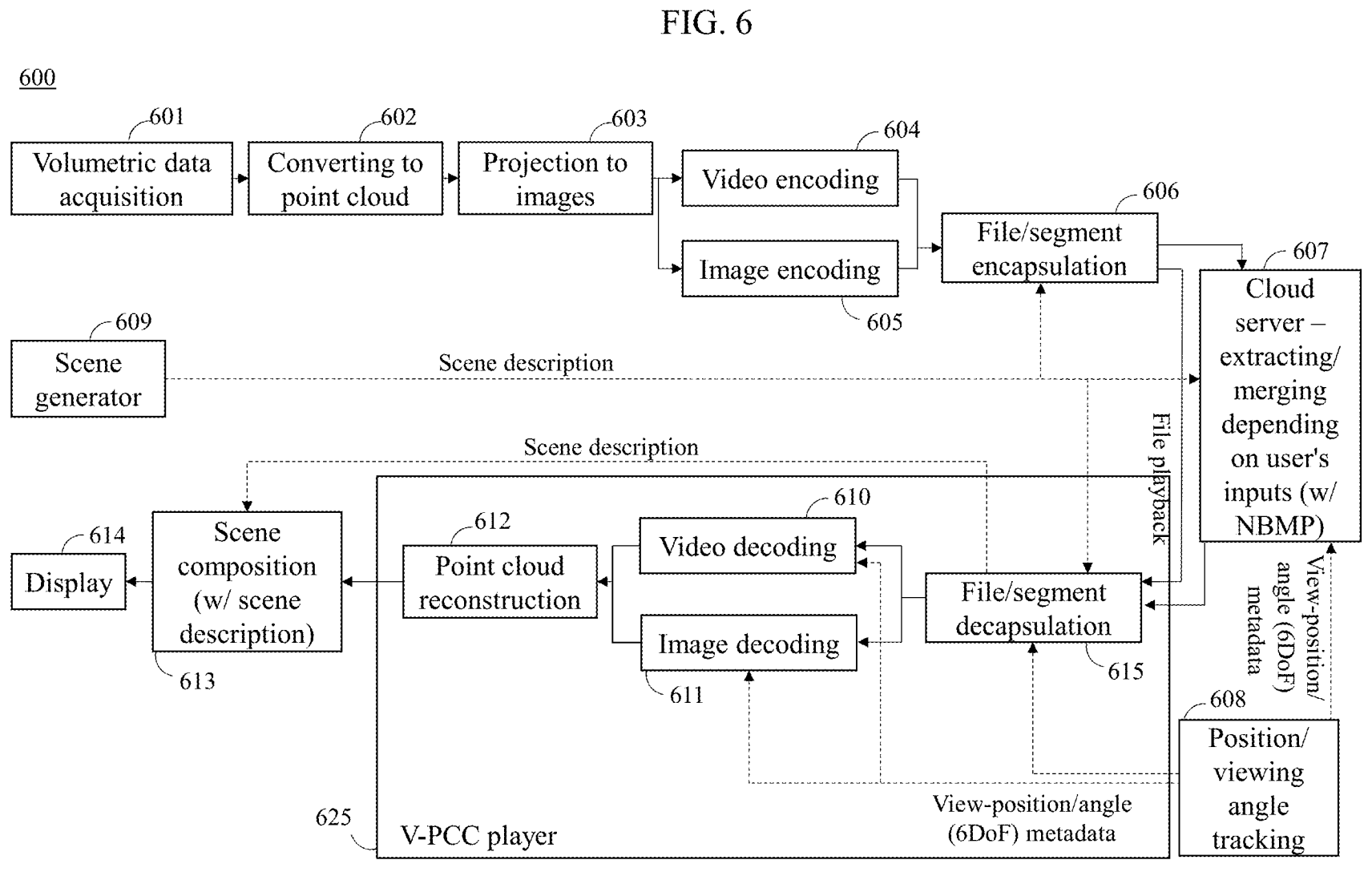

FIG. 6 illustrates a simplified block-style content flow process diagram 600 for (coded) point cloud data with view-position and angle dependent processing of point cloud data (herein "V-PCC") with respect to capturing/generating/ (de) coding/rendering/displaying 6 degree-of-freedom media. It is to be understood that the described features may be used separately or combined in any order and elements such as for encoding and decoding, among others illustrated, may be implemented by processing circuitry (e.g., one or more processors or one or more integrated circuits), and the one or more processors may execute a program that is stored in a non-transitory computer-readable medium according to exemplary embodiments.

The diagram 600 illustrates exemplary embodiments for streaming of coded point cloud data according to V-PCC.

At the volumetric data acquisition block 601, a real-world visual scene or a computer-generated visual scene (or combination of them) may be captured by a set of camera devices or synthesized by a computer as a volumetric data, and the volumetric data, which may have an arbitrary format, may be converted to a (quantized) point cloud data format, through image processing at the converting to point cloud block 602. For example, data from the volumetric data may be area data by area data converted into ones of points of the point cloud by pulling one or more of the values described below from the volumetric data and any associated data into a desired point cloud format according to exemplary embodiments. According to exemplary embodiments, the volumetric data may be a 3D data set of 2D images, such as slices from which a 2D projection of the 3D data set may be projected for example. According to exemplary embodiments, point cloud data formats include representations of data points in one or more various spaces and may be used to represent the volumetric data and may offer improvements with respect to sampling and data compression, such as with respect to temporal redundancies, and, for example, a point cloud data in an x, y, z, format representing, at each point of multiple points of the cloud data, color values (e.g., RGB, etc.), luminance, intensity, etc. and could be used with progressive decoding, polygon meshing, direct rendering, octree 3D representations of 2D quadtree data.

At projection to images block 603, the acquired point cloud data may be projected onto 2D images and encoded as image/video pictures with video-based point cloud coding (V-PCC). The projected point cloud data may be composed of attributes, geometry, occupancy map, and other metadata used for point cloud data reconstruction such as with painter's algorithms, ray casting algorithms, (3D) binary space partition algorithms, among others for example.

At the scene generator block 609, on the other hand, a scene generator may generate some metadata to be used for rendering and displaying 6 degrees-of-freedom (DoF) media, by a director's intention or a user's preference for example. Such 6 DoF media may include the 360VR like 3D viewing of a scene from rotational changes on 3D axis X, Y, Z in addition to additional dimension allowing for movement front/back, up/down, and left/right with respect to a virtual experience within or at least according to point cloud coded data. The scene description metadata defines one or more scene composed of the coded point cloud data and other media data, including VR360, light field, audio, etc. and may be provided to one or more cloud servers and or file/segment encapsulation/decapsulation processing as indicated in FIG. 6 and related descriptions.

After video encoding block 604 and image encoding block 605 similar to the video and image encoding described above (and as will be understood, audio encoding also may be provided as described above), file/segment encapsulation block 606 processes such that the coded point cloud data are composed into a media file for file playback or a sequence of an initialization segment and media segments for streaming according to a particular media container file format such as one or more video container formats and such as may be used with respect to DASH described below, among others as such descriptions represent exemplary embodiments. The file container also may include the scene description metadata, such as from the scene generator block 1109, into the file or the segments.

According to exemplary embodiments, the file is encapsulated depending on the scene description metadata to include at least one view position and at least one or more angle views at that/those view position(s) each at one or more times among the 6DoF media such that such file may be transmitted on request depending on user or creator input. Further, according to exemplary embodiments, a segment of such file may include one or more portions of such file such as a portion of that 6DoF media indicating a single viewpoint and angle thereat at one or more times; however, these are merely exemplary embodiments and may be changed depending on various conditions such as network, user, creator capabilities and inputs.

According to exemplary embodiments, the point cloud data is partitioned into multiple 2D/3D regions, which are independently coded such as at one or more of video encoding block 604 and image encoding block 605. Then, each independently coded partition of point cloud data may encapsulated at file/segment encapsulation block 606 as a track in a file and/or segment. According to exemplary embodiments, each point cloud track and/or a metadata track may include some useful metadata for view-position/angle dependent processing.

According to exemplary embodiments, the metadata, such as included in a file and/or segment encapsulated with respect to the file/segment encapsulation block, useful for the view-position/angle dependent processing includes one or more of the following: layout information of 2D/3D partitions with indices, (dynamic) mapping information associating a 3D volume partition with one or more 2D partitions (e.g. any of a tile/tile group/slice/sub-picture), 3D positions of each 3D partition on a 6DoF coordinate system, representative view position/angle lists, selected view position/angle lists corresponding to a 3D volume partition, indices of 2D/3D partitions corresponding to a selected view position/angle, quality (rank) information of each 2D/3D partition, and rendering information of each 2D/3D partition for example depending on each view position/angle. Calling on such metadata when requested, such as by a user of the V-PCC player or as directed by a content creator for the user of the V-PCC player, may allow for more efficient processing with respect to specific portions of the 6DoF media desired with respect to such metadata such that the V-PCC player may deliver higher quality images of focused on portions of the 6DoF media than other portions rather than delivering unused portions of that media.

From the file/segment encapsulation block 606, the file or one or more segments of the file may be delivered using a delivery mechanism (e.g., by Dynamic Adaptive Streaming over HTTP (DASH)) directly to any of the V-PCC player 625 and a cloud server, such as at the cloud server block 607 at which the cloud server can extract one or more tracks and/or one or more specific 2D/3D partitions from a file and may merge multiple coded point cloud data into one data.

According to data such as with the position/viewing angle tracking block 608, if the current viewing position and angle(s) is/are defined on a 6DoF coordinate system, at a client system, then the view-position/angle metadata may be delivered, from the file/segment encapsulation block 606 or otherwise processed from the file or segments already at the cloud server, at cloud server block 607 such that the cloud sever may extract appropriate partition(s) from the store file(s) and merge them (if necessary) depending on the metadata from the client system having the V-PCC player 625 for example, and the extracted data can be delivered to the client, as a file or segments.

With respect to such data, at the file/segment decapsulation block 615, a file decapsulator processes the file or the received segments and extracts the coded bitstreams and parses the metadata, and at video decoding and image decoding blocks 610 and 611, the coded point cloud data are then decoded into decoded and reconstructed, at point cloud reconstruction block 612, to point cloud data, and the reconstructed point cloud data can be displayed at display block 614 and/or may first be composed depending on one or more various scene descriptions at scene composition block 613 with respect to scene description data according to the scene generator block 609.

In view of the above, such exemplary V-PCC flow represents advantages with respect to a V-PCC standard including one or more of the described partitioning capabilities for multiple 2D/3D areas, a capability of a compressed domain assembly of coded 2D/3D partitions into a single conformant coded video bitstream, and a bitstream extraction capability of coded 2D/3D of a coded picture into conformant coded bitstreams, where such V-PCC system support is further improved by including container formation for a VDC bitstream to support a mechanism to contain metadata carrying one or more of the above-described metadata.

In that light and according to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 7:
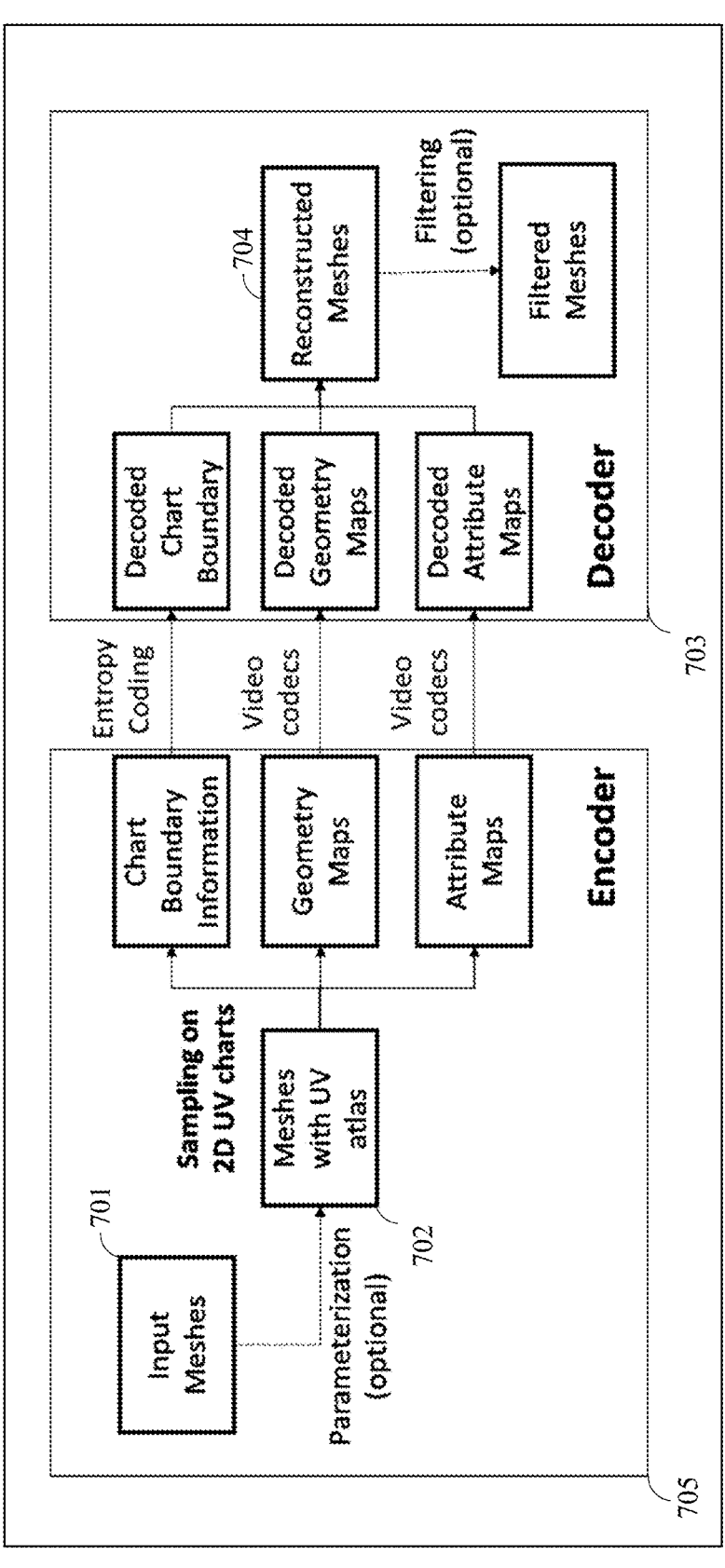
FIG. 7 is an illustration of aspects of an encoder and decoder system in the context of media mesh features in accordance with one or more embodiments herein.

FIG. 7 represents an example framework 700 of one dynamic mesh compression such as for a 2D atlas sampling based method. Each frame of the input meshes 701 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 702, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 703 side, the meshes can be reconstructed from the decoded 2D maps. Any post-processing and filtering can also be applied on the reconstructed meshes 704. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information. As illustrated in the example 800 of volumetric data in FIG. 8, the UV parameterization process 802 of mapping from 3D mesh segments onto 2D charts, such as to the above noted 2D UV atlases 702 block, maps one or more mesh segments 801 onto a 2D chart 803 in the 2D UV atlas 804. Each vertex ($v_n$) in the mesh segment will be assigned with a 2D UV coordinates in the 2D UV atlas. Note that the vertices ($v_n$) in a 2D chart form a connected component as their 3D counterpart. The geometry, attribute, and connectivity information of each vertex can be inherited from their 3D counterpart as well. For example, information may be indicated that vertex $v_4$ connects directly to vertices $v_0$, $v_5$, $v_1$, and $v_3$, and similarly information of each of the other vertices may also be likewise indicated. Further, such 2D texture mesh would, according to exemplary embodiments, further indicate information, such as color information, in a patch-by-patch basis such as by patches of each triangle, e.g., $v_2$, $v_5$, $v_3$ as one "patch".

Figure 8:
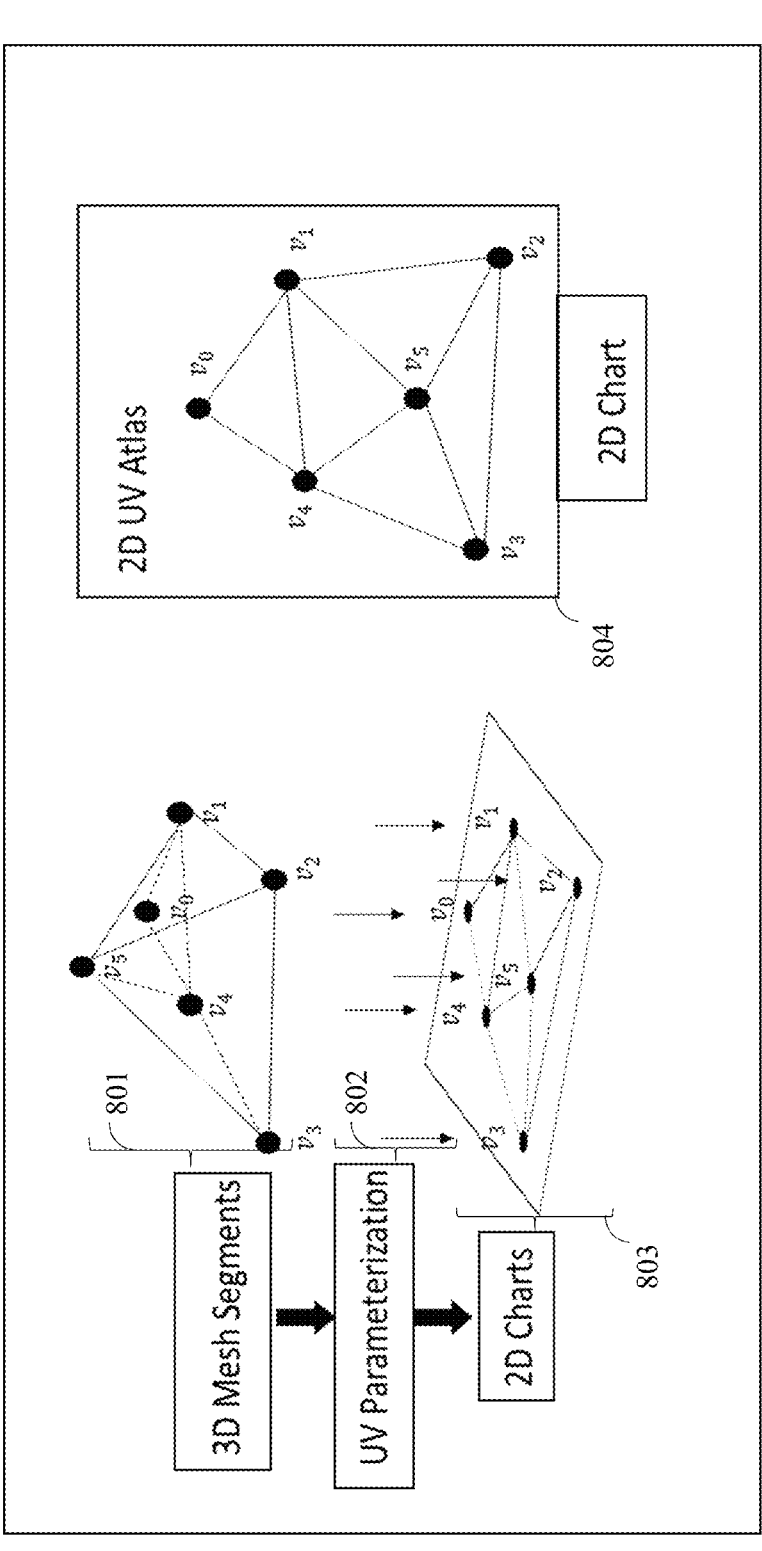
FIG. 8 is an illustration of aspects of mesh processing in accordance with one or more embodiments herein.
Figure 9:
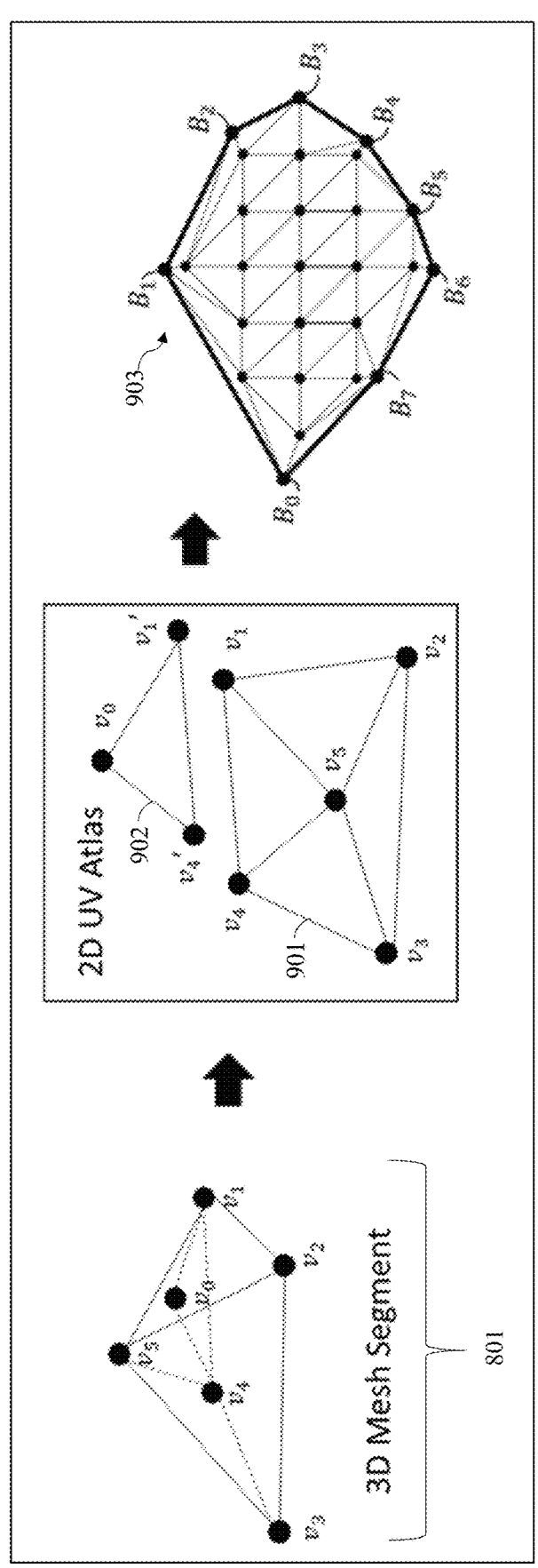
FIG. 9 is an illustration of aspects of mesh processing in accordance with one or more embodiments herein.
Figure 14:
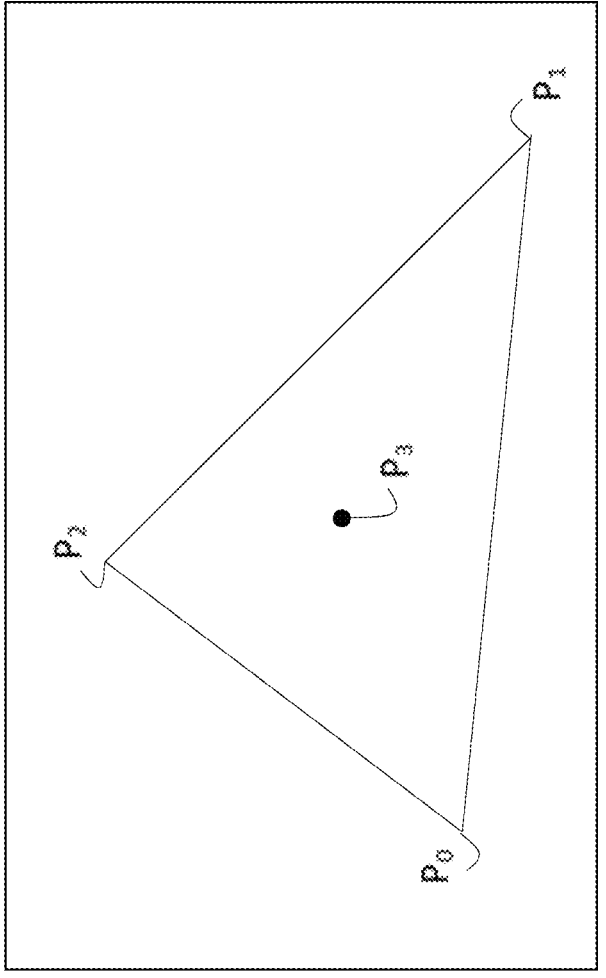
FIG. 14 is an illustration of aspects of a mesh subdivision scheme in accordance with one or more embodiments herein.

For example, further to the features of the example 800 of FIG. 8, see the example 900 of FIG. 9 where the 3D mesh segment 801 can be also mapped to multiple separate 2D charts 901 and 902. In this case, a vertex in 3D could corresponds to multiple vertices in 2D UV atlas. As shown in FIG. 9, the same 3D mesh segment is mapped to multiple 2D charts, instead of a single chart as in FIG. 8, in the 2D UV atlas. For example, 3D vertices $v_1$ and $v_4$ each have two 2D correspondences $v_1$, $v_1$, and $v_4$, $v_4$', respectively. As such, a general 2D UV atlas of a 3D mesh may consist of multiple charts as shown in FIG. 14, where each chart may contain multiple (usually more than or equal to 3) vertices associated with their 3D geometry, attribute, and connectivity information.

FIG. 9 shows an example 903 illustrating a derived triangulation in a chart with boundary vertices $B_0$, $B_1$, $B_2$, $B_3$, $B_4$, $B_5$, $B_6$, $B_7$. When presented with such information, any triangulation method can be applied to create connectivity among the vertices (including boundary vertices and sampled vertices). For example, for each vertex, find the closest two vertices. Or for all vertices, continuously generate triangles until a minimum number of triangles is achieved after a set number of tries. As shown in the example 903, there are various regularly shaped, repeating triangles and various oddly shaped triangles, generally closest to the boundary vertices, having their own unique dimensions that may or may not be shared with any other of the triangles. The connectivity information can be also reconstructed by explicit signaling. If a polygon cannot be recovered by implicit rules, the encoder can signal the connectivity information in the bitstream according to exemplary embodiments.

Boundary vertices $B_0$, $B_1$, $B_2$, $B_3$, $B_4$, $B_5$, $B_6$, $B_7$ are defined in the 2D UV space. A boundary edge can be determined by checking if the edge is only appeared in one triangle. The following information of boundary vertices is significant and should be signaled in the bitstream according to exemplary embodiments: geometry information, e.g., the 3D XYZ coordinates even though currently in the 2D UV parametric form, and the 2D UV coordinates.

For a case in which a boundary vertex in 3D corresponds to multiple vertices in 2D UV atlas, such as shown in FIG. 9, the mapping from 3D XUZ to 2D UV can be one-to-multiple. Therefore, a UV-to-XYZ (or referred to as UV2XYZ) index can be signaled to indicate the mapping function. UV2XYZ may be a 1D-array of indices that correspond each 2D UV vertex to a 3D XYZ vertex.

According to exemplary embodiments, to represent a mesh signal efficiently, a subset of the mesh vertices may be coded first, together with the connectivity information among them. In the original mesh, the connection among these vertices may not exist as they are subsampled from the original mesh. There are different ways to signal the connectivity information among the vertices, and such subset is therefore referred to as the base mesh or as base vertices.

According to exemplary embodiments, a number of methods are implemented for dynamic mesh compression and are part of the above-mentioned edge-based vertex prediction framework, where a base mesh is coded first and then more additional vertices are predicted based on the connectivity information from the edges of the base mesh. Note that they can be applied individually or by any form of combinations.

Figure 10:
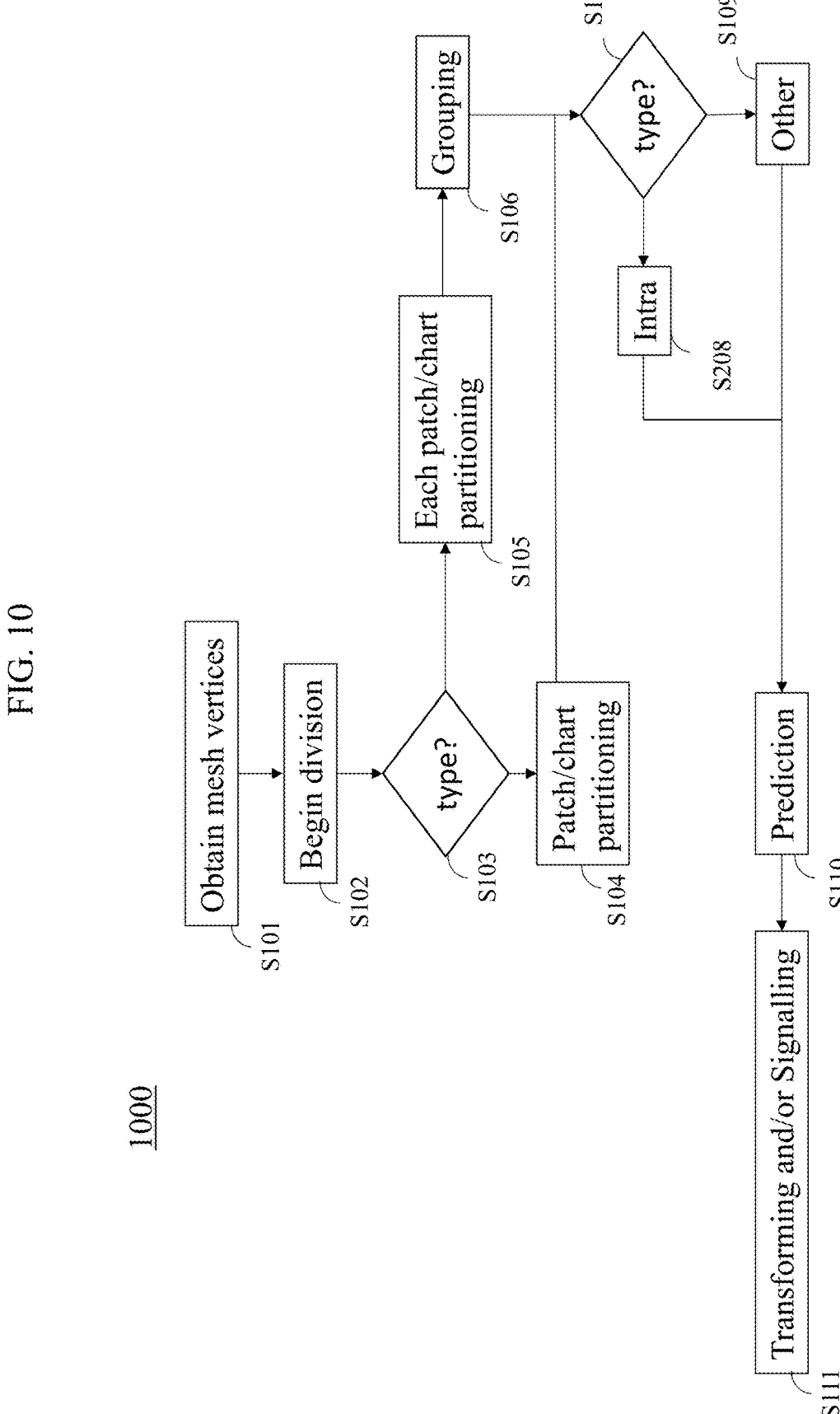
FIG. 10 is a flowchart illustrating aspects of mesh processing in accordance with one or more embodiments herein.

For example, consider the vertex grouping for prediction mode example flowchart 1001 of FIG. 10. At S101, vertices inside a mesh may be obtained and can be divided at S102 into different groups for prediction purposes, for example see FIG. 9. In one example, the division is done using the patch/chart partitioning at S104. In another example, the division is done under each patch/chart S105. The decision S103 whether to proceed to S104 or S105 may be signaled by a flag or the like. In the case of S105, several vertices of the same patch/chart form a prediction group and will share the same prediction mode, while several other vertices of the same patch/chart can use another prediction mode. Herein, a "prediction mode" may be considered to be a specific mode that a decoder uses to make a prediction for a video content including the patch, the prediction mode can categorically be divided into intra prediction modes and inter prediction modes, and within each category, there can be different specific modes that the decoder chooses from. According to exemplary embodiments, each group, a "prediction group" may share a same specific mode (e.g., an angular mode at a specific angle) or a same categorical prediction mode (e.g., all intra prediction mode but can be predicted at different angles) according to exemplary embodiments. Such grouping at S106 can be assigned at different levels by determining respective number of vertices involved per group. For example, every 64, 32 or 16 vertices following a scan order inside a patch/chart will be assigned the same prediction mode according to exemplary embodiments and other vertices may be differently assigned. For each group, a prediction mode can be intra prediction mode or inter prediction mode. This can be signaled or assigned. According to the example flowchart 1000, if a mesh frame or mesh slice is determined to be in intra type at S107, such as by checking whether a flag of that mesh frame or mesh slice indicates an intra type, then all groups of vertices inside that mesh frame or mesh slice shall use intra prediction mode; otherwise, at S108 either intra prediction or inter prediction mode may be chosen per group for all vertices therein.

Further, for a group of mesh vertices using intra prediction mode, its vertices can only be predicted by using previously coded vertices inside the same sub-partition of the current mesh. Sometimes the sub-partition can be the current mesh itself according to exemplary embodiments, and for a group of mesh vertices using inter prediction mode, its vertices can only be predicted by using previously coded vertices from another mesh frame according to exemplary embodiments. Each of the above-noted information may be determined and signaled by a flag or the like. Said prediction features may occur at S110 and results of said prediction and signaling may occur at S111

According to exemplary embodiments, for each vertex in a group of vertices in the example flowchart 1000 and in the flowchart 1100 described below, after prediction, the residue will be a 3D displacement vector, indicating the shift from the current vertex to its predictor. The residues of a group of vertices need to be further compressed. In one example, transformation at S111, along with the signaling thereof, can be applied to the residues of a vertex group, before entropy coding. The following methods may be implemented to handle the coding of a group of displacement vectors. For example, in one method, to properly signal the case where a group of displacement vectors, some displacement vectors, or its components have only zero values. In another embodiment, a flag is signaled for each displacement vectors whether this vector has any non-zero component, and if no, the coding of all components for this displacement vector can be skipped. Further, in another embodiment, a flag is signaled for each group of displacement vectors whether this group has any non-zero vectors, and if no, the coding of all displacement vectors of this group can be skipped. Further, in another embodiment, a flag is signaled for each component of a group of displacement vectors whether this component of the group has any non-zero vectors, and if no, the coding of this component of all displacement vectors s of this group can be skipped. Further, in another embodiment, there may be a signaling of the case where a group of displacement vectors, or a component of the group of displacement vectors, needs a transformation, and if not, the transformation can be skipped, and quantization/entropy coding can be directly applied to the group or the group components. Further, in another embodiment, a flag may be signaled for each group of displacement vectors whether this group needs to go through transformation, and if no, the transform coding of all displacement vectors of this group can be skipped. Further, in another embodiment, a flag is signaled for each component of a group of displacement vectors whether this component of the group needs to go through transformation, and if no, the transform coding of this component of all displacement vectors of this group can be skipped. The above-described embodiments in this paragraph, which regard handling of vertex prediction residues, may also be combined and implemented in parallel on different patches respectively.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

Figure 11:
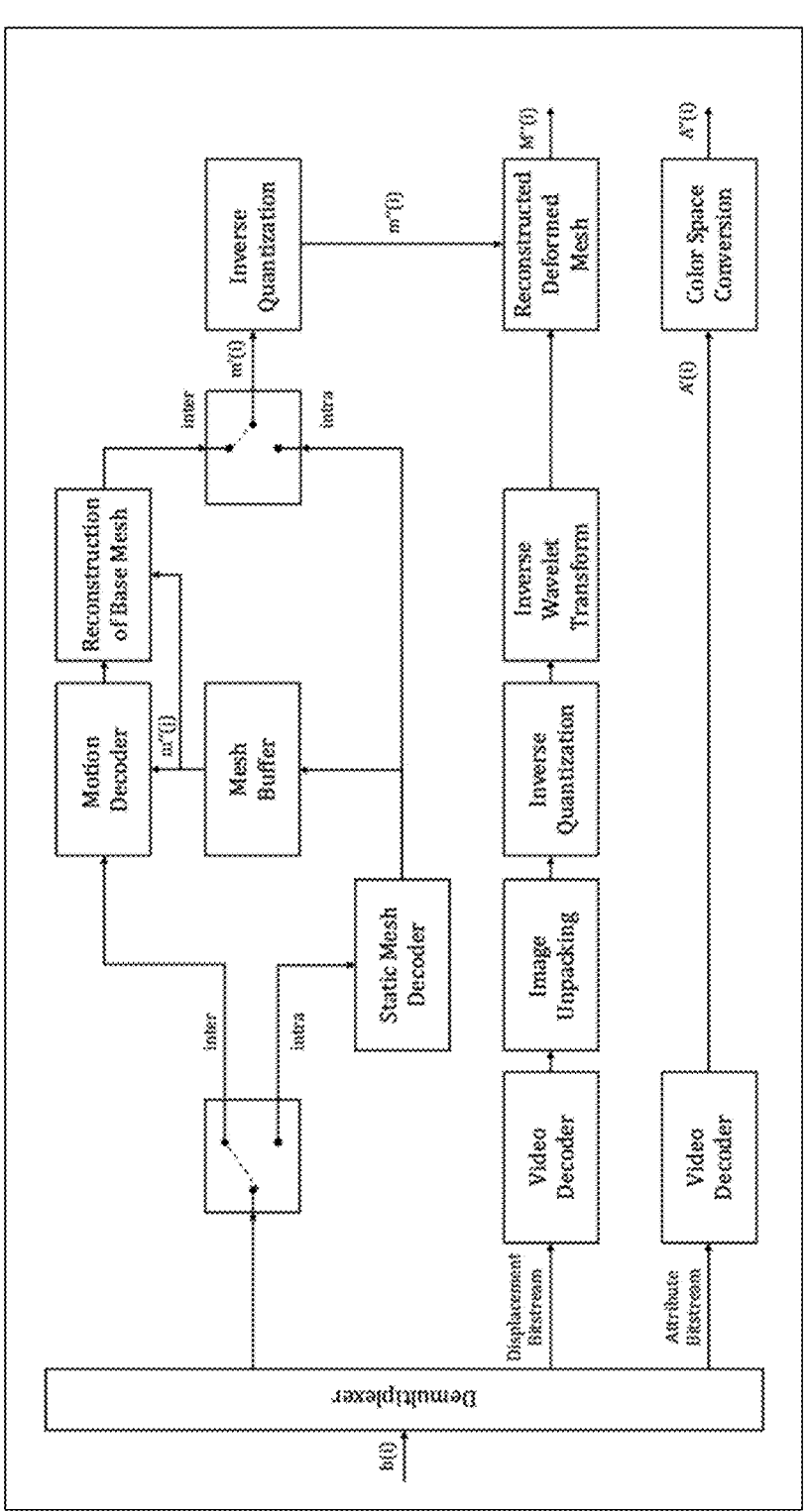
FIG. 11 is an illustration of aspects of a mesh decoder in accordance with one or more embodiments herein.

In FIG. 11, an example V-Mesh decoding process according to exemplary embodiments. The incoming bitstream is de-multiplexed into three parts, i.e., base mesh bitstream, displacement bitstream and attribute bitstream.

Depending on coding mode used in the base mesh bitstream, either intra decoding path or inter decoding path is chosen. For intra decoding path, base mesh is decoded through static mesh decoder; for inter decoding path, motion vectors are decoded through Motion Decoder, according to embodiments. The vertices in a reference mesh that is stored in the Mesh buffer and the decoded motion vectors are combined to form the reconstructed base mesh. If sub-division process is enabled in the bitstream, a mid-point sub-division process is applied to generate middle points using the vertices in the base mesh and previously generated middle points. The subdivided mesh is called m' (i) in FIG. 11. After dequantization process, m' (i) becomes m" (i).

To decode displacement bitstream, according to embodiments, video decoder followed by image unpacking, inverse quantization and inverse wavelet transform are applied to generate decoded displacement for vertices in the base mesh and middle points generated in the subdivision process. The decoded displacement and m' (i) are combined to form the decoded mesh denoted as M" (i).

To decode attribute bitstream, a video decoder is employed with followed color space conversion if needed according to embodiments.

But, as noted above, in a mesh codec, such as MPEG V-Mesh Test model, a mid-point subdivision method is employed to refine a decimated mesh sequences due to its simplicity. However, one drawback of mid-point subdivision is that its granularity is large, i.e., every iteration of mid-point subdivision will quadruple the number of triangles. For example, three iterations of subdivisions increase the number of triangles to 64 times of that of the original one. Therefore, it is here disclosed that it has been found desirable to introduce sub-division with finer granularity.

In addition, displacement vectors, either 3D vectors or 1D vectors along the normal direction, are often used to offset the position of the mid-point vertices and the original vertices. Since one mid-point vertex is generated for each edge of the original mesh, the number of additional displacement vectors will be number of edges in the original mesh.

Figure 12:
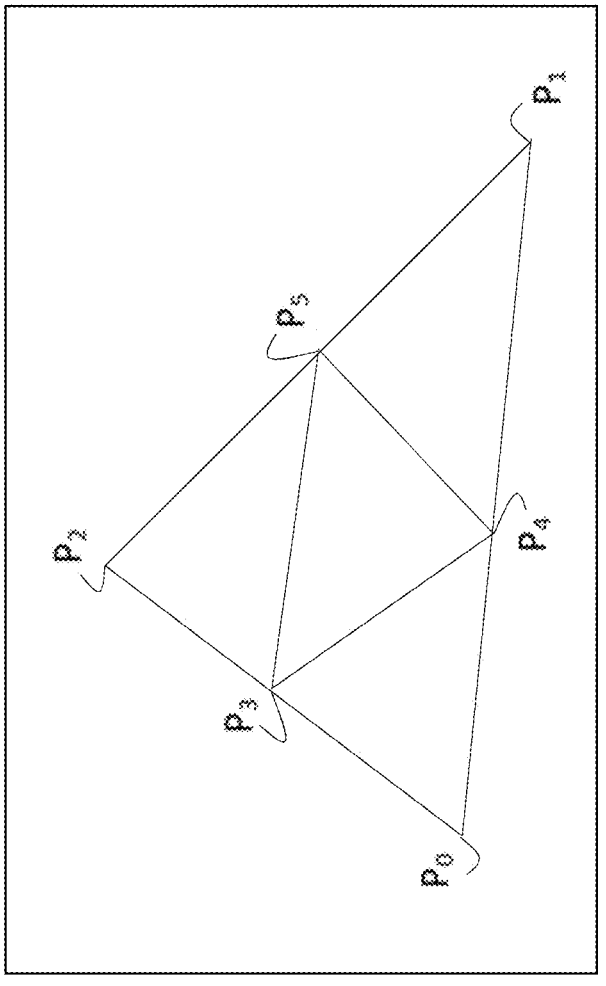
FIG. 12 is an illustration of aspects of a mesh subdivision scheme in accordance with one or more embodiments herein.

Like in a mesh codec such as MPEG V-Mesh codec, and according to embodiments herein, a mid-point subdivision scheme is used to sub-divide the base mesh to recover details of original mesh after decimation process. In this process, an edge is split into two parts with equal length, such as in the example 1200 in FIG. 12.

In FIG. 3, the original triangle is $P_0P_1P_2$. Point $P_3$, $P_4$ and $P_5$ are the middle points of edge $P_2P_0$, $P_0P_1$ and $P_1P_2$. In this way, the original triangle is sub-divided into 4 smaller triangles, i.e., $P_0P_4P_3$, $P_4P_5P_3$, $P_4P_1P_5$, $P_5P_2P_3$. Note that the mid-point subdivision process can be done in multiple iterations. For example, after one more subdivision iteration, the triangle in FIG. 12 will become 16 smaller triangles. In practice, 1-3 iterations are often used according to embodiments.

According to embodiments, there may be denoting of the coordinates of point $P_i$ as $(x_i, y_i, z_i)$. Without loss of generality, the middle point $P_3$ is used as an example. Its coordinates can be computed in floating operation as following:

$$x_3 = 0.5 * (x_0 + x_2) \qquad \text{Eq. (1)}$$

$$y_3 = 0.5 * (y_0 + y_2)$$

$$z_3 = 0.5 * (z_0 + z_2)$$

where $(x_i, y_i, z_i)$ are represented as single precision or double precision numbers.

According to embodiments, there is provided a "√3 subdivision" which is a uniform subdivision scheme, in which a new vertex for every triangle of a given mesh is generated. The process is shown the example 1300 in FIG. 13, described as following three steps:

(1) At S1302, after obtaining an original Mesh M0 at S1301, insert one vertex in each triangle of the original mesh M0.

(2) At S1303, connect the new vertex to the three vertices of its surrounding triangle.

(3) And at S1304, flip every original edge, excluding those at boundary, that connect two old vertices. In the flip operation, the two new vertices in two adjacent triangles are connected, the common edge in the two adjacent triangles are removed.

In the √3 subdivision, the number of faces increase by the factor of 3 instead of 4 in a mid-point subdivision. In this sense, the √3 subdivision provides finer granularity.

In addition, since one new vertex is generated for each triangle, the number of additional displacement vectors will be the number of triangles in the original mesh, which is less than the number of edges in the original mesh.

Consider, as in example 1400 of FIG. 4, that there is denoting of a triangle in the mesh M0 as $P_0P_1P_2$, the new vertex inside the triangle is $P_3$. That is, $P_3$ may be considered a new vertex in the triangle.

According to one or more embodiments, the coordinates of the new vertex $P_3$ are expressed as a linear combination of the coordinates of the three vertices, show as following:

$$P_3 = c_0 P_0 + c_1 P_1 + c_2 P_2, \qquad \text{Eq. (2)}$$

where $c_0$, $c_1$, $c_2$ are non-negative real coefficients and $c_0 + c_1 + c_2 = 1$. Note that $P_i = (x_i, y_i, z_i)$, for i=0, 1, 2, 3, represents the 3D coordinates of the point $P_i$. In practice, $c_0$, $c_1$, $c_2$ are often set to be equal to ⅓. In another embodiment, a nonlinear combination can be employed.

Figure 13:
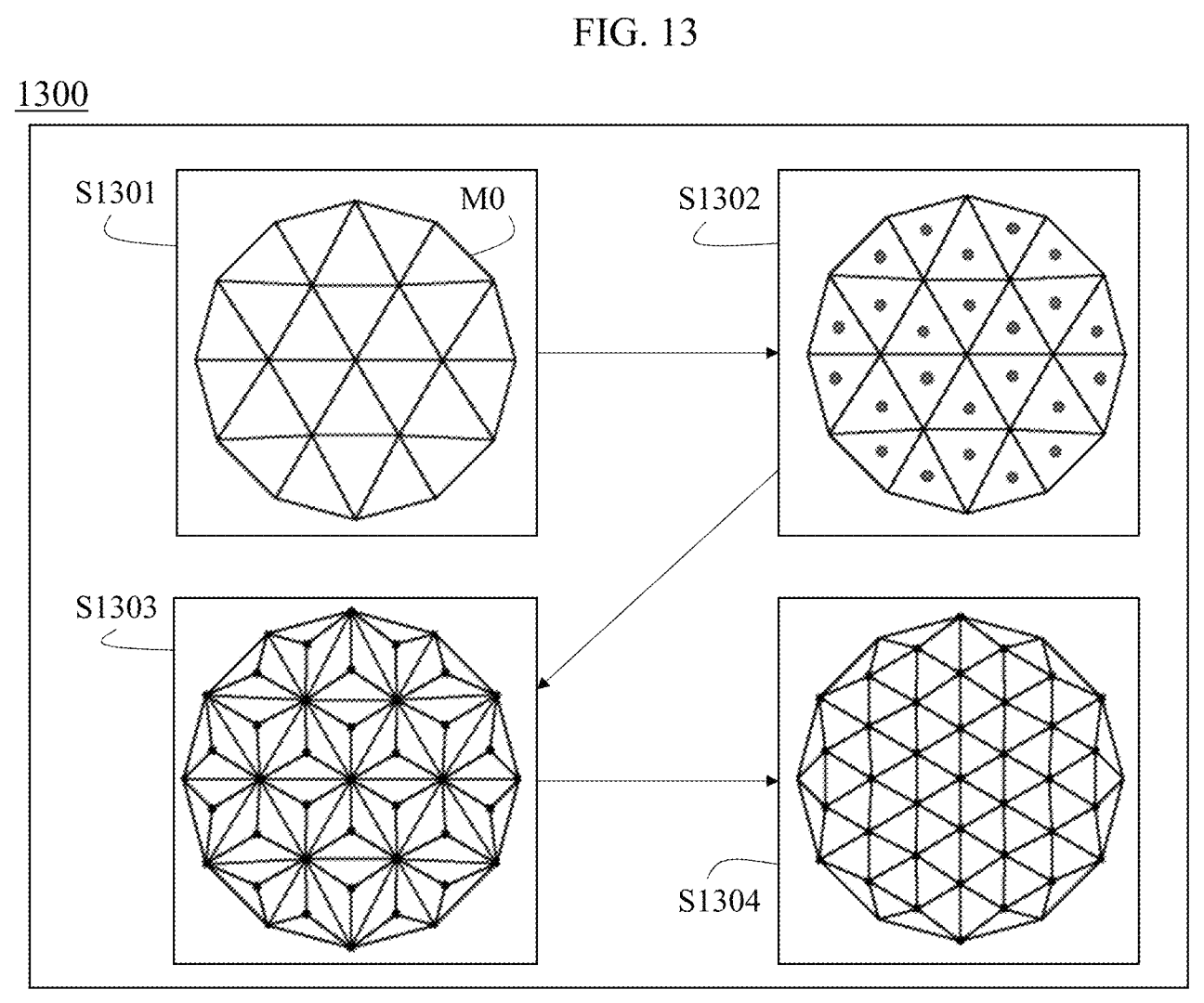

As shown in S1304 of FIG. 13, starting from the original mesh, all interior edges are flipped. A boundary edge cannot be flipped since there is only one incident triangle. Thus, the boundary edge are not affected in the first iteration of subdivision.

Figure 15:
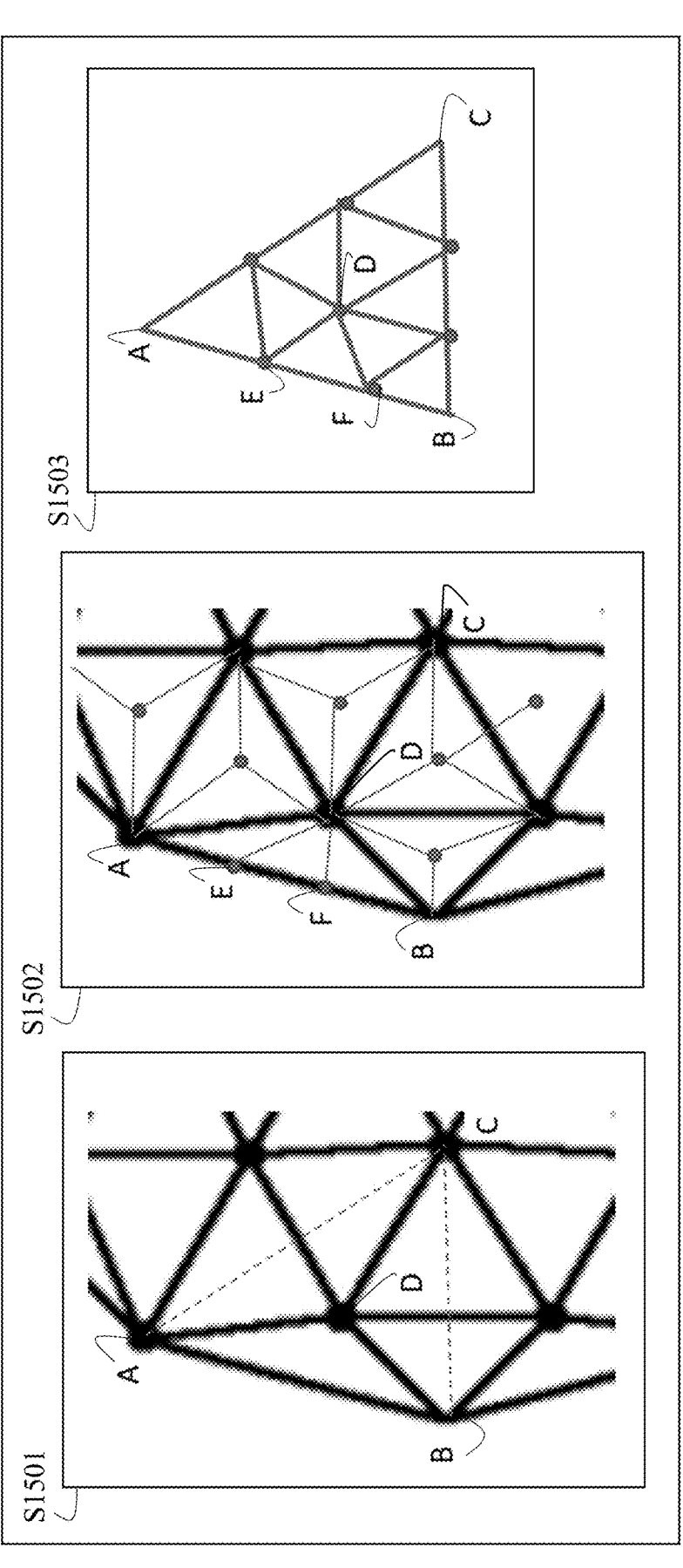
FIG. 15 is an illustration of aspects of a mesh subdivision scheme considering boundaries in accordance with one or more embodiments herein.

For illustration, a small portion of S1304 of FIG. 13 is enlarged and shown the step S1501 of example 1500 of FIG. 15. That is, in a second or subsequent iteration of subdivision, a vertex is inserted into each interior triangle; for boundary triangles, such as ABD, a boundary edge is sub-divided into 3 equal-length edges by inserting two vertices, such as E and F. The inserted vertices are connected to the original vertices in their surrounding triangles. For the boundary triangle ABD, ED and FD are connected, as shown in step S1502 of FIG. 15 according to embodiments. Finally, the interior edges are flipped, as shown the step S1503, to complete the second iteration. Note that the triangle ABC in the original mesh is subdivided into 9 triangles after 2 iterations, just like all the interior triangles in the original mesh.

In mesh compression, displacement vectors are often used to adjust vertex coordinates of a subdivided mesh. See example 1600 of FIG. 16 which shows the displacement vectors of vertices $P_0$, $P_1$, $P_2$ and the new vertex $P_3$.

Figure 16:
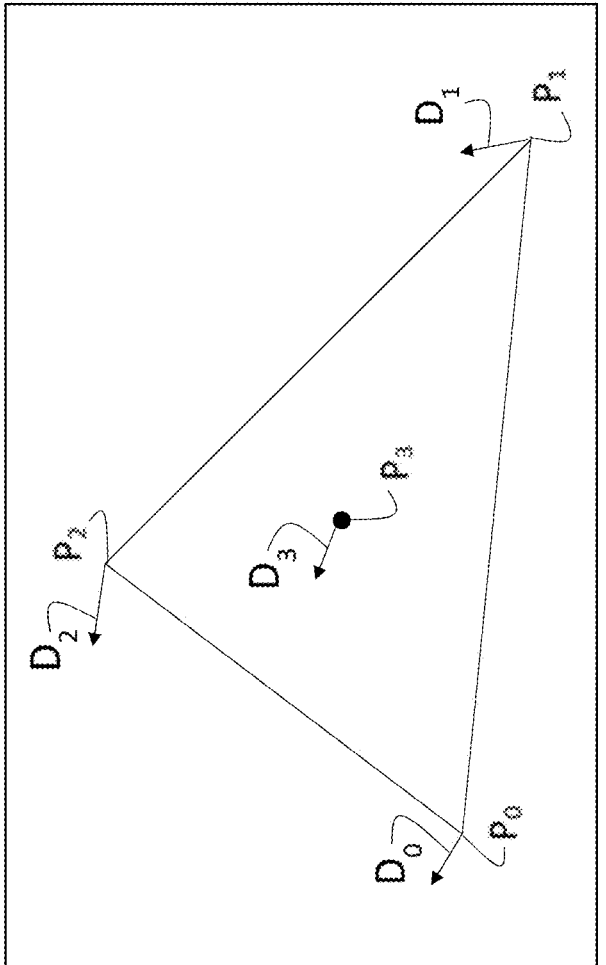
FIG. 16 is an illustration of aspects of mesh displacement vectors in in accordance with one or more embodiments herein.

In FIG. 16, $D_0$, $D_1$, $D_2$ and $D_3$ are the displacement vectors of the corresponding vertices. To facilitate compression, displacement vectors can be transformed using wavelet transform with lifting which includes prediction and update operation according to embodiments. Note that other types of transforms are also possible.

In one embodiment of the invention, the displacement vector of the new vertex is predicted using the displacement vectors of the vertices of its surrounding triangle. Using FIG. 16 as an example, $D_3$ is predicted using $D_0$, $D_1$, $D_2$. In one embodiment, a linear prediction is used, shown as following:

$$\hat{D}_3 = \alpha_0 D_0 + \alpha_1 D_1 + \alpha_2 D_2 \qquad \text{Eq. (3)}$$

where $\hat{D}_3$ is the predictor of $D_3$; $\alpha_0$, $\alpha_1$, $\alpha_2$ are non-negative real coefficients and $\alpha_0 + \alpha_1 + \alpha_2 = 1$. In practice, the coefficients $\alpha_0$, $\alpha_1$, $\alpha_2$ can be set to ⅓. Note that $D_i$, i=0, 1, 2, 3 can be a 3-D vector or a 1-D vector if only the displacement along the normal direction of the associated vertex is used. In addition, $D_i$, i=0, 1, 2, 3 can be a 3-D vector in 444 sampling format, 420 sampling format, 400 sampling format, or some other sampling format. In another embodiment, a nonlinear prediction can be employed, i.e., $\hat{D}_3 = f(D_0, D_1, D_2)$ where $f(D_0, D_1, D_2)$ is a nonlinear function of $D_0$, $D_1$, $D_2$.

After the prediction, the prediction residual can be computed by subtracting its predictor from the displacement vector. For example, the prediction residual of $D_3$ is shown as follows:

$$\tilde{D}_3 = D_3 - \hat{D}_3 \qquad \text{Eq. (4)}$$

In one embodiment of the invention, an update operation is used, i.e., the prediction residuals of displacement vectors are used to adjust the prediction residuals of the original mesh. The details of the process are disclosed as follows.

In the encoder, assume K subdivision iterations are done. Before any subdivision, the mesh is called the base mesh for differentiation and its vertices are called vertices in $LOD_0$; after the first subdivision, the generated new vertices inside each triangle in the subdivision are called vertices in $LOD_1$; similarly, the generated new vertices in the k-th subdivision are called vertices in $LOD_k$. In the encoder, Prediction/Update steps are done for each LOD level, starting from $LOD_K$ to $LOD_1$.

In the prediction step, denote w as a vertex in $LOD_k$; Denote $v_1$ as vertices in LOD level lower than k. Without loss of generality, denote $v_0$, $v_1$ and $v_2$ are the three vertices of its surrounding triangle of w. Denote D(p) and $\tilde{D}$(p) as the displacement vector and its prediction residual of a vertex p in any LOD level. From Equation 2 and 3, we have the following formular:

$$\tilde{D}(w) = D(w) - (\alpha_0 D(v_0) + \alpha_1 D(v_1) + \alpha_2 D(v_0)) \qquad \text{Eq. (5)}$$

Or $$\tilde{D}(w) = D(w) - f(D(v_0), D(v_1), D(v_0)) \qquad \text{Eq. (6)}$$

In the update step, denotes v as a vertex in LOD level lower than k; Denotes W* are the set of vertices in $LOD_k$ that are immediate neighbors of vertex v. In one embodiment, the displacement vector of v is updated as following:

$$D(v) = D(v) + \beta \sum_{w \in W^*} \tilde{D}(w) \qquad \text{Eq. (7)}$$

where $\beta$ is a real coefficient. if $\beta=0$, no update step is applied. In practice, $\beta$ can be set as a positive number close 0.1.

To indicate that $\sqrt{3}$ subdivision is used in the encoder and the displacement vectors are associated with this type of subdivision, certain signaling is needed in the compressed bitstream.

Without loss of generality, MPEG V-Mesh standards are used as an example. The sub-division method table can be expanded as following:

| asps_vmc_ext_subdivision_method | Name of subdivision method |
| --- | --- |
| 0 | NONE |
| 1 | MIDPOINT |
| 2 | SQRT3 | where SQRT3 denotes the $\sqrt{3}$ subdivision.

According to embodiments, the coefficients related to the subdivision, i.e., $c_0$, $c_1$, $c_2$, and the coefficients related to wavelet transform with lifting, i.e., $\alpha_0$, $\alpha_1$, $\alpha_2$ and $\beta$ can fixed in the standards or sent in the parameter set.

As such, in a mesh codec, such as MPEG V-Mesh Test model, a mid-point subdivision method is employed to refine a decimated mesh sequences due to its simplicity. However, one drawback of mid-point subdivision is that its granularity is large, i.e., every iteration of mid-point subdivision will quadruple the number of triangles. For example, three iterations of subdivisions increase the number of triangles to 64 times of that of the original one. Therefore, it is desirable to introduce sub-division with finer granularity, as with embodiments herein.

In addition, displacement vectors, either 3D vectors or 1D vectors along the normal direction, are often used to offset the position of the mid-point vertices and the original vertices. Since one mid-point vertex is generated for each edge of the original mesh, the number of additional displacement vectors will be number of edges in the original mesh.

By embodiments herein, a square root of three, i.e., $\sqrt{3}$, subdivision is provided, which only triple number of triangles after each iteration. The method of $\sqrt{3}$ subdivision is first introduced. As an example, the related changes to syntax and decoding process to MPEG V-Mesh standards are described above according to exemplary embodiments.

The techniques described above, can be implemented as computer software using computer-readable instructions and physically stored in one or more computer-readable media or by a specifically configured one or more hardware processors. For example, FIG. 17 shows a computer system 1700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
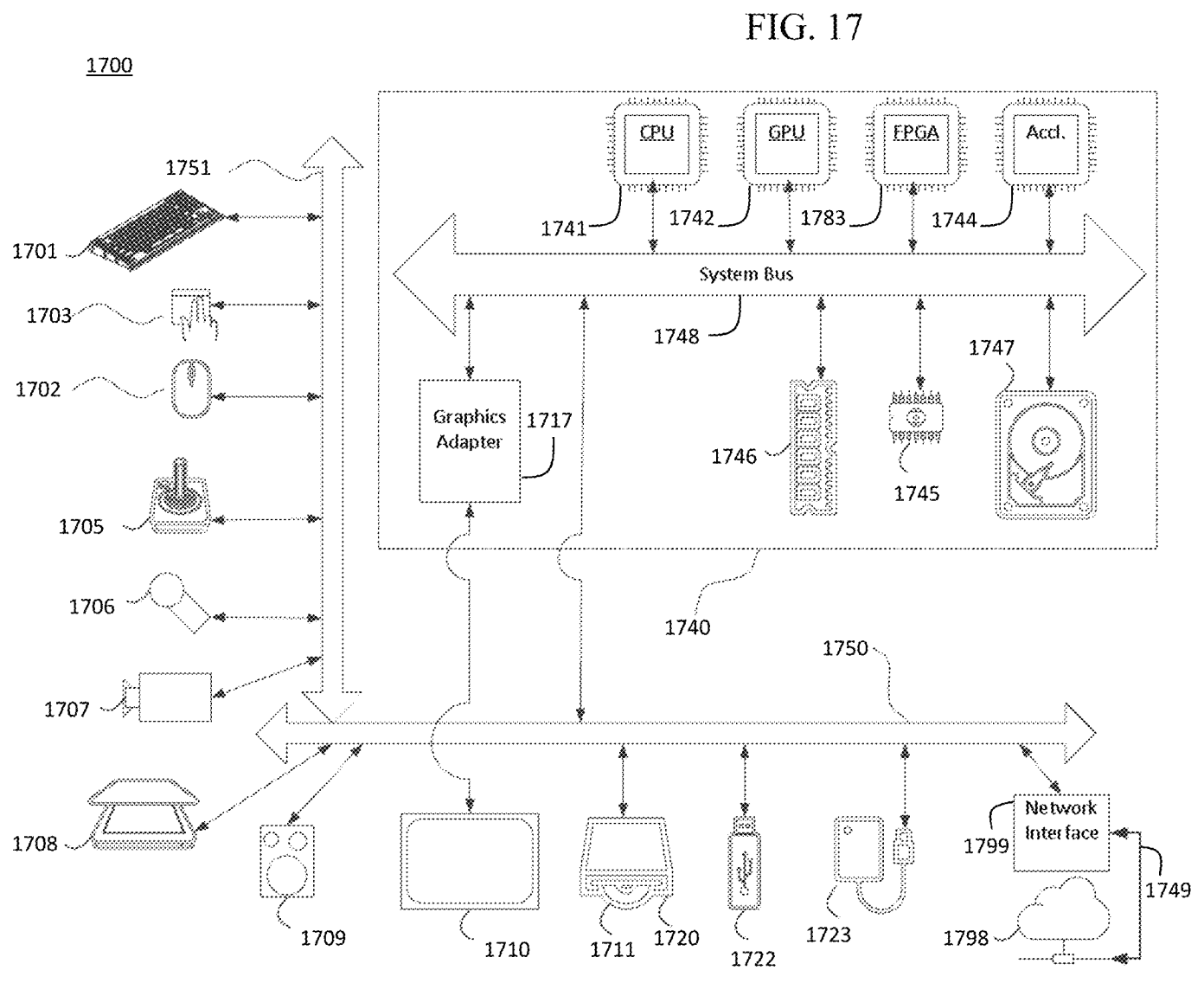

The components shown in FIG. 17 for computer system 1700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1700.

Computer system 1700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1701, mouse 1702, trackpad 1703, touch screen 1710, joystick 1705, microphone 1706, scanner 1708, camera 1707.

Computer system 1700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1710, or joystick 1705, but there can also be tactile feedback devices that do not serve as input devices), audio output devices (such as: speakers 1709, headphones (not depicted)), visual output devices (such as screens 1710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1700 can also include human accessible storage devices and their associated media such as optical media including CD/DVD ROM/RW 1720 with CD/DVD 1711 or the like media, thumb-drive 1722, removable hard drive or solid state drive 1723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1700 can also include interface 1799 to one or more communication networks 1798. Networks 1798 can for example be wireless, wireline, optical. Networks 1798 can further be local, wide-area, metropolitan, vehicular and industrial, real-time, delay-tolerant, and so on. Examples of networks 1798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1798 commonly require external network interface adapters that attached to certain general-purpose data ports or peripheral buses (1750 and 1751) (such as, for example USB ports of the computer system 1700; others are commonly integrated into the core of the computer system 1700 by attachment to a system bus as described below (for example Ethernet interface into a PC computer system or cellular network interface into a smartphone computer system). Using any of these networks 1798, computer system 1700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1740 of the computer system 1700.

The core 1740 can include one or more Central Processing Units (CPU) 1741, Graphics Processing Units (GPU) 1742, a graphics adapter 1717, specialized programmable processing units in the form of Field Programmable Gate Areas (FPGA) 1743, hardware accelerators for certain tasks 1744, and so forth. These devices, along with Read-only memory (ROM) 1745, Random-access memory 1746, internal mass storage such as internal non-user accessible hard drives, SSDs, and the like 1747, may be connected through a system bus 1748. In some computer systems, the system bus 1748 can be accessible in the form of one or more physical plugs to enable extensions by additional CPUs, GPU, and the like. The peripheral devices can be attached either directly to the core's system bus 1748, or through a peripheral bus 1749. Architectures for a peripheral bus include PCI, USB, and the like.

CPUs 1741, GPUs 1742, FPGAs 1743, and accelerators 1744 can execute certain instructions that, in combination, can make up the aforementioned computer code. That computer code can be stored in ROM 1745 or RAM 1746. Transitional data can be also be stored in RAM 1746, whereas permanent data can be stored for example, in the internal mass storage 1747. Fast storage and retrieval to any of the memory devices can be enabled through the use of cache memory, that can be closely associated with one or more CPU 1741, GPU 1742, mass storage 1747, ROM 1745, RAM 1746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1700, and specifically the core 1740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1740 that are of non-transitory nature, such as core-internal mass storage 1747 or ROM 1745. The software implementing various embodiments of the present disclosure can be stored in such devices and executed by core 1740. A computer-readable medium can include one or more memory devices or chips, according to particular needs. The software can cause the core 1740 and specifically the processors therein (including CPU, GPU, FPGA, and the like) to execute particular processes or particular parts of particular processes described herein, including defining data structures stored in RAM 1746 and modifying such data structures according to the processes defined by the software. In addition or as an alternative, the computer system can provide functionality as a result of logic hardwired or otherwise embodied in a circuit (for example: accelerator 1744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, the method performed by at least one processor and comprising:

obtaining, from a bitstream, a mesh representing an encoded volumetric data of at least one three-dimensional (3D) visual content; and decoding the encoded volumetric data based on displacement vectors of vertices of the mesh, wherein the displacement vectors are based on a square root of three subdivision in which faces of the mesh are iteratively subdivided in a manner in which a number of subdivided faces resulting from subdividing the mesh in an iteration is less than four times a number of faces from before subdividing the mesh in the iteration.

2. The method for video decoding according to claim 1, wherein the square root of three subdivision comprises, in the iteration:

inserting one of a plurality of inserted vertices into ones of the faces from before subdividing the mesh in the iteration, and interconnecting the plurality of inserted vertices thereby forming the number of subdivided faces of the mesh.

3. The method for video decoding according to claim 2, wherein inserting one of the plurality of inserted vertices into ones of the faces from before subdividing the mesh in the iteration comprises inserting only one of the plurality of inserted vertices per the faces from before subdividing the mesh in the iteration.

4. The method for video decoding according to claim 3, wherein at least one of the inserted vertices, inserted into one of the faces from before subdividing the mesh, is based on a linear combination of coordinates of vertices of the one of the faces.

5. The method for video decoding according to claim 4, wherein the linear combination comprises each of the coordinates of the vertices of the ones of the faces scaled by respective non-negative real coefficients.

6. The method for video decoding according to claim 5, wherein the respective non-negative real coefficients are each set to ⅓.

7. The method for video decoding according to claim 2, wherein the square root of three subdivision comprises subdividing boundary edges of the mesh differently than interior edges of the mesh such that at least two new inserted vertices are added in the iteration to at least one of the boundary edges.

8. An apparatus for video decoding, the apparatus comprising:

at least one memory configured to store computer program code;

at least one processor configured to access the computer program code and operate as instructed by the computer program code, the computer program code including:

obtaining code configured to cause the at least one processor to obtain, from a bitstream, a mesh representing an encoded volumetric data of at least one three-dimensional (3D) visual content; and decoding code configured to cause the at least one processor to decode the encoded volumetric data based on displacement vectors of vertices of the mesh, wherein the displacement vectors are based on a square root of three subdivision in which faces of the mesh are iteratively subdivided in a manner in which a number of subdivided faces resulting from subdividing the mesh in an iteration is less than four times a number of faces from before subdividing the mesh in the iteration.

9. The apparatus for video decoding according to claim 8, wherein the square root of three subdivision comprises, in the iteration:

inserting one of a plurality of inserted vertices into ones of the faces from before subdividing the mesh in the iteration, and interconnecting the plurality of inserted vertices thereby forming the number of subdivided faces of the mesh.

10. The apparatus for video decoding according to claim 9, wherein inserting one of the plurality of inserted vertices into ones of the faces from before subdividing the mesh in the iteration comprises inserting only one of the plurality of inserted vertices per the faces from before subdividing the mesh in the iteration.

11. The apparatus for video decoding according to claim 10, wherein at least one of the inserted vertices, inserted into one of the faces from before subdividing the mesh, is based on a linear combination of coordinates of vertices of the one of the faces.

12. The apparatus for video decoding according to claim 11, wherein the linear combination comprises each of the coordinates of the vertices of the ones of the faces scaled by respective non-negative real coefficients.

13. The apparatus for video decoding according to claim 12, wherein the respective non-negative real coefficients are each set to ⅓.

14. The apparatus for video decoding according to claim 8, wherein the square root of three subdivision comprises subdividing boundary edges of the mesh differently than interior edges of the mesh such that at least two new inserted vertices are added in the iteration to at least one of the boundary edges.

15. A non-transitory computer readable medium storing a program causing a computer to:

obtain, from a bitstream, a mesh representing an encoded volumetric data of at least one three-dimensional (3D) visual content; and decode the encoded volumetric data based on displacement vectors of vertices of the mesh, wherein the displacement vectors are based on a square root of three subdivision in which faces of the mesh are iteratively subdivided in a manner in which a number of subdivided faces resulting from subdividing the mesh in an iteration is less than four times a number of faces from before subdividing the mesh in the iteration.

16. The non-transitory computer readable medium according to claim 15, wherein the square root of three subdivision comprises, in the iteration:

inserting one of a plurality of inserted vertices into ones of the faces from before subdividing the mesh in the iteration, and interconnecting the plurality of inserted vertices thereby forming the number of subdivided faces of the mesh.

17. The non-transitory computer readable medium according to claim 16, wherein inserting one of the plurality of inserted vertices into ones of the faces from before subdividing the mesh in the iteration comprises inserting only one of the plurality of inserted vertices per the faces from before subdividing the mesh in the iteration.

18. The non-transitory computer readable medium according to claim 17, wherein at least one of the inserted vertices, inserted into one of the faces from before subdividing the mesh, is based on a linear combination of coordinates of vertices of the one of the faces.

19. The non-transitory computer readable medium according to claim 18, wherein the linear combination comprises each of the coordinates of the vertices of the ones of the faces scaled by respective non-negative real coefficients, and wherein the respective non-negative real coefficients are each set to ⅓.

20. The non-transitory computer readable medium according to claim 15, wherein the square root of three subdivision comprises subdividing boundary edges of the mesh differently than interior edges of the mesh such that at least two new inserted vertices are added in the iteration to at least one of the boundary edges.

* * * * *